Figure 1:
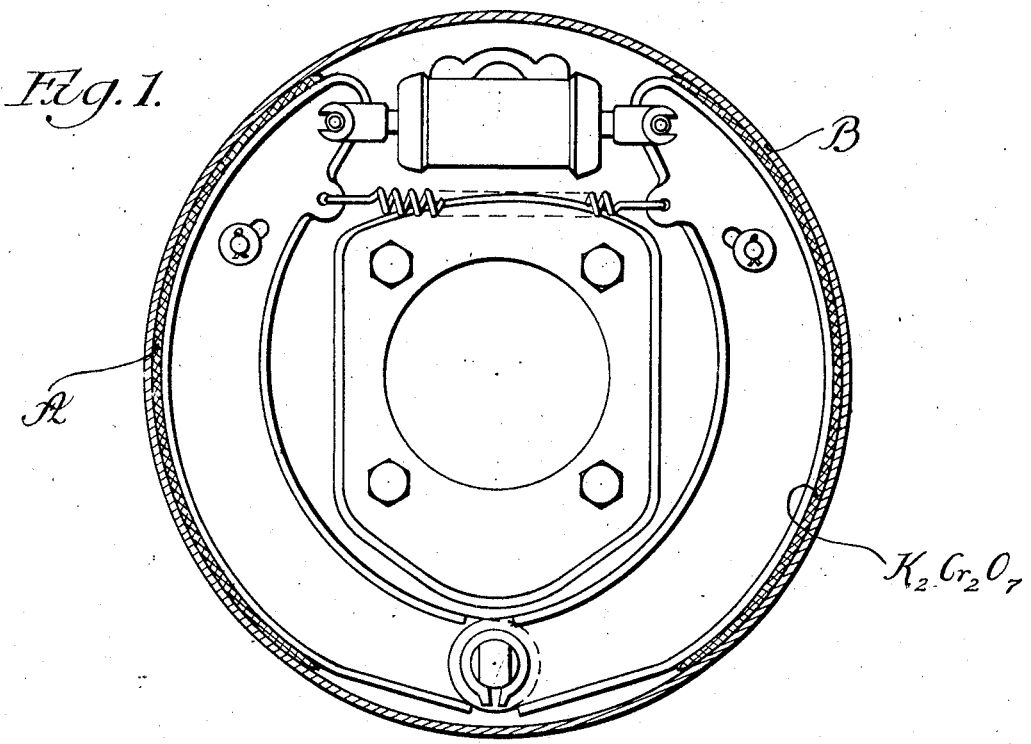

June 18, 1929.   M. LOUGHEAD   1,717,393
NONSQUEALING BRAKE
Filed Nov. 15, 1926

Inventor
Malcolm Loughead
By Williams, Bradbury, McCaleb & Hinkle
Attys.

Patented June 18, 1929.

1,717,393

UNITED STATES PATENT OFFICE.

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA.

NONSQUEALING BRAKE.

Application filed November 15, 1926. Serial No. 148,608.

My invention relates to brakes—especially automobile brakes—and has for its principal object the elimination of the squeal or squeak so frequently occurring in automobile brakes.

My observations have led me to the conclusion that a major portion of squeal in automobile brakes is due to the formation of rust on the polished surfaces of the steel brake drum, the hard rust particles probably being forced along the braking surface of the drum to reduce the objectionable metal to metal squeal.

Another important advantage gained by the prevention of rusting of the drum braking surfaces is the elimination of a period of extreme sensitiveness of the brakes which would otherwise be experienced until the rust formation was worn away.

A typical illustration of the effect of rust formation is when an automobile is left out of doors over night during a fog. If one were to jack up one of the wheels and remove the drums he would find a rust formation along the polished braking surface of the drum. If the wheel is replaced and the automobile driven, the first application of the brakes will produce a severe squeal. The brakes will be very noticeably sensitive, that is, the slightest pressure on the foot pedal will give an almost instantaneous stop. This, of course, is because the rust formation has so roughened the braking surface of the drum that the linings grab with many times their usual friction. After a few applications of the brake this sensitiveness will go away because the rust formation will be worn away and the drum again take on its smooth polish. But the squeal does not disappear so readily. This is probably because the fine, hard rust particles become imbedded in the lining and continue for some time, even several days, to squeal although, of course, not so noticeably as when first starting out with rusted drums.

The instance of leaving a car out over night in a fog is only one instance of a number of causes resulting in the rusting of the drum. Another is driving through a rain or over wet roads and then allowing the car to stand long enough for the brakes to dry out and the drums to rust. The rusting of the drums and the subsequent squealing of the brakes naturally come some time after, rather than during, exposure to moisture. The effect of this rusting of the brakes has been so remote from the cause that heretofore no one has, I believe, connected the two as affording a satisfactory explanation of the majority of squeals in automobile brakes.

Making the drums from a rust proof steel, or plating the drums with a rust preventative, as chromium plate, would probably suffice to prevent the formation of this rust on the friction surfaces, but the cost of either expedient would be greater than the majority of automobile manufacturers would care to add to the cost of their cars to secure this relief.

In the drawings forming a part of this application

Figure 2:
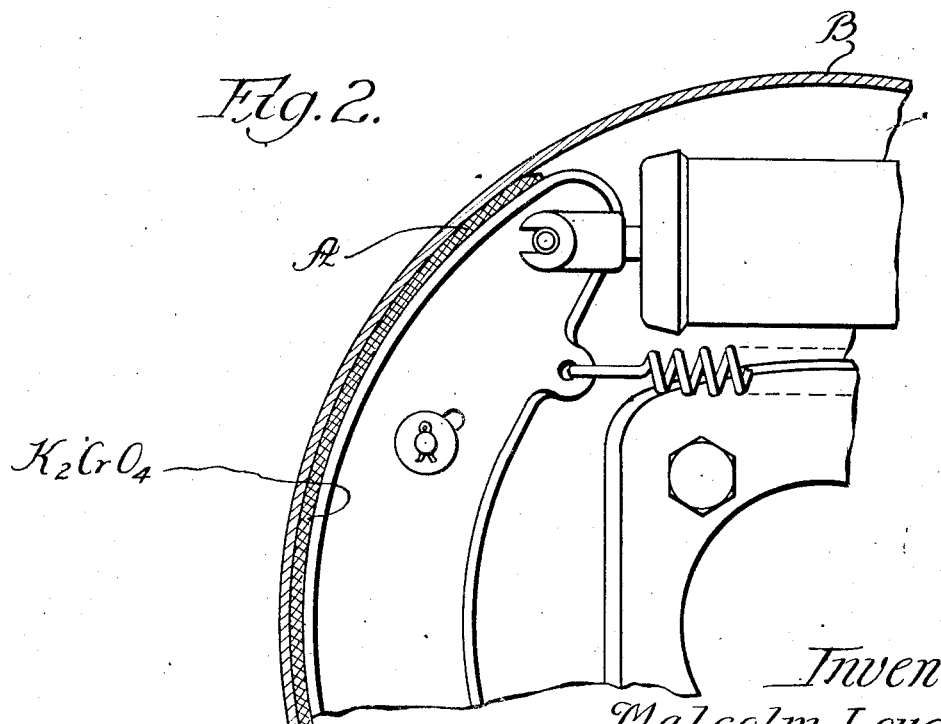

Figure 1 is an elevation illustrating a conventional brake assembly embodying my invention; and Figure 2 is a fragmentary elevation illustrating and embodying a modification of the invention.

As an economical method of accomplishing this result I prefer to treat the brake linings A with an agent which, as it is transferred from time to time on to the drums, will act as a rust preventative. I have used potassium dichromate ($K_2Cr_2O_7$) successfully as such an agent. Potassium dichromate crystals are readily soluble in water. The brake linings A are soaked in the solution, and when the linings dry out the crystals are left rather evenly imbedded throughout the linings. Satisfactory results have been obtained with usual commercial linings made chiefly from woven asbestos. Such linings generally absorb water to ten or fifteen percent of their own weight. The linings may be subjected to this treatment either after they are completed or at any convenient time during the process of manufacture. Normal potassium chromate ($K_2CrO_4$) may be substituted, if desired, it being more soluble in water, but more expensive.

I contemplate that many other rust preventing agents may be used in lieu of these chromates.

There are two ways by which the chromate is transferred from the impregnated lining A to the polished surfaces of the drum B. One is by moisture which tends to wash a little of the chromate solution out of the lining and on to the drum during wet weather. The other is a mechanical rubbing of the exposed chromate crystals against the polished lining.

In either case the friction surfaces of the drum B will be given a thin application of the rust preventing chromate. One advantage of having the chromate soluble in water, is that even if the chromate were deposited in spots about the drum surfaces, the presence of any moisture would tend to even it out over the entire surface, thereby avoiding any possibility of the drum rusting in spots or pitholes.

While I believe that the effect of the chromate will last as long as the lining A, because new crystals are exposed as the lining wears down, I contemplate that in instances where the effect of the chromate becomes lost, or in untreated linings A already in use, the solution can be applied to the linings in somewhat the same manner as the usual automobile brake dressings are applied by squirt cans.

Careful tests which I have made on dynamometer brake testing apparatus have shown no perceptible change in the frictional characteristics of brake linings after impregnating them with these chromates.

In addition to its quality of preventing the formation of rust when applied on the friction surfaces of the drum B, I believe that the chromate with which the lining A is impregnated acts of itself to eliminate the squeal even though rust is formed on the drum B. In other words, I believe that the treatment given the lining A of itself eliminates the squeal independently of its function in preventing formation of rust on the drum B. I contemplate that other agents can be used in place of these particular chromates in producing this function also.

While I have described the operation and advantages of my invention as particularly concerned with automobile brakes, it is obvious that it is applicable to many other kinds of friction brakes.

What I claim is:

1. The combination with a metal brake drum and a brake element for engagement therewith comprising a brake member and a brake lining thereon, of a corrosion preventing agent carried by the brake element and adapted to be applied to the drum upon application of the brake element.

2. A porous textile brake lining impregnated with a rust preventing agent soluble in water.

3. A porous textile brake lining impregnated with a rust preventing agent soluble in water which does not lessen its frictional characteristic.

4. A method of imparting rust preventing quality to a brake lining without impairing its frictional characteristics, which consists in impregnating the lining with potassium dichromate.

5. A method of imparting rust preventing quality to a brake lining without impairing its frictional characteristic, which consists in impregnating the lining with a rust preventing agent soluble in water.

6. The combination with a brake drum having a steel braking surface, and a brake member therefor provided with a brake lining, of a means for rendering the braking surfaces of the drum non-rusting without impairing the co-efficient of friction between the drum and the lining which comprises a potassium chromate carried in the lining and transferable therefrom to the braking surface of the drum during application of the brake member.

7. The combination with a brake drum having a steel braking surface, a brake member therefor provided with a brake lining, and means for rendering the braking surfaces of the drum non-rusting without impairing the co-efficient of friction between the drum and the lining, which comprises a potassium chromate carried in the lining and transferable therefrom to the surface of the brake drum by the agency of moisture.

8. The combination with a brake drum having a steel braking surface, a brake member therefor provided with a brake lining and means for rendering the braking surfaces of the drum non-rusting without impairing the co-efficient of friction between the drum and the lining, which comprises an agent soluble in water and carried in the brake lining as an impregnation thereof; which when applied to the friction surface of the drum renders it non-rusting.

9. The combination with a brake drum having a steel braking surface, a brake member therefor provided with a brake lining and means for rendering the braking surfaces of the drum non-rusting without impairing the co-efficient of friction between the drum and the lining, which comprises an agent carried in the brake lining as an impregnation thereof, which when applied to the friction surface of the drum renders it non-rusting.

10. The method of eliminating the squeal of a brake comprising a steel drum and a fabricated brake lining, which consists in treating the brake lining with an agent which when applied to the drum renders the latter non-rusting.

11. The method of eliminating the squeal from a braking apparatus comprising a steel friction member which consists in rendering the steel member non-rusting.

12. The method of eliminating the squeal from a braking apparatus comprising a steel friction member which consists in rendering the steel member non-rusting by an agent soluble in water.

13. A brake lining for use in frictional engagement with a brake drum of corrosive metal which lining is impregnated with an agent soluble in water, which when transferred to the friction surfaces of the drum renders the latter non-corrosive without altering the frictional characteristic between the drum and the lining.

14. A brake lining for use in frictional engagement with a brake drum of corrosive metal which lining is impregnated with an agent, which when transferred to the friction surfaces of the drum renders the latter non-corrosive without altering the frictional characteristic between the drum and the lining.

15. A brake lining for engagement with a metallic friction member, which lining is impregnated with potassium dichromate.

16. A brake lining for engagement with a metallic friction member, which lining is impregnated with a potassium chromate.

17. The combination of a steel brake drum having a polished braking surface and a brake member for frictional engagement therewith provided with a textile brake lining impregnated with a rust preventing agent soluble in water.

18. The combination of a brake drum having a steel braking surface and a brake member for frictional engagement therewith provided with a brake lining impregnated with a non-lubricating rust preventing agent adapted to be transferred to the drum by application of the lining.

19. The combination of a brake drum having a steel braking surface and a brake member for frictional engagement therewith provided with a brake lining impregnated with a non-lubricating rust preventing agent soluble in water adapted to be transferred to the drum by application of the lining in the presence of moisture.

In witness whereof, I hereunto subscribe my name this 10th day of November, 1926.

MALCOLM LOUGHEAD.